Nov. 8, 1949     V. WRIDGE     2,487,085
SWIVEL ARCH HOOK
Filed April 18, 1946

Inventor
VIRGIL WRIDGE

By *Clarence A. O'Brien
and Harvey B. Jacobson*
Attorneys

Patented Nov. 8, 1949

2,487,085

UNITED STATES PATENT OFFICE 2,487,085

SWIVEL ARCH HOOK

Virgil Wridge, Tillamook, Oreg.

Application April 18, 1946, Serial No. 663,211

2 Claims. (Cl. 287—91)

This invention relates to improvements in swivel arch hooks.

An object of the invention is to provide an improved swivel arch hook which will include swivel means for supporting an end of a steel wire cable and ball-bearing means therefor.

Another object of the invention is to provide an improved swivel arch hook formed with cooperating ball and roller races for swivelly mounting one end of a wire cable for permitting the hook to swivel about the end of the cable.

A further object of the invention is to provide an improved swivel arch hook formed with means for supporting an end of a steel wire cable for swivel movement in the body portion of said hook, together with a radial ball-bearing and a cooperating tapered roller bearing for permitting free and unrestricted swivel motion of said cable end within the hook.

Another object of the invention is to provide an improved swivel arch hook formed with an enlarged body portion suitably recessed to receive and support the swivelled end of a steel wire cable for rotation therein, together with means including a radial ball-bearing and a tapered roller bearing mounted about the swivel connection for permitting free and unrestricted rotary motion of said hook about the cable end, and the end of said body being rounded and formed with a frusto-conical aperture through which the cable end will pass, thereby providing a smooth surface for said cable to positively prevent chafing or binding of the same.

Other objects will appear as the description proceeds.

In the accompanying drawings which form a part of this application,

Like characters of reference are used throughout the following specification and the accompanying drawings to designate corresponding parts.

Figure 1:
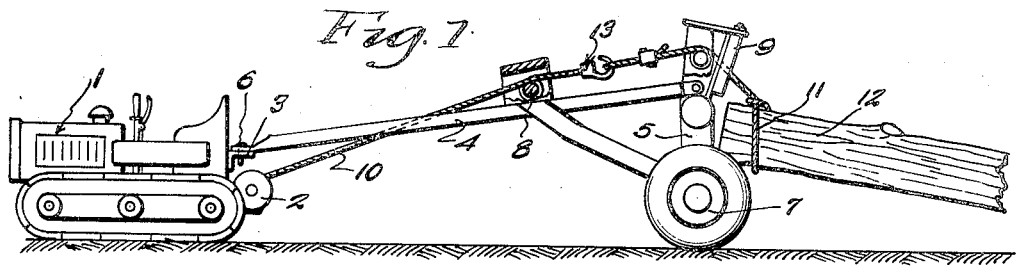
Figure 1 is a side elevation of a tractor shown with a connected truck and a cable line connected with the power drum from said tractor including an improved swivel arch hook adapted to extend over said truck and to be looped about an end of a log for hauling the same.
Figure 2:
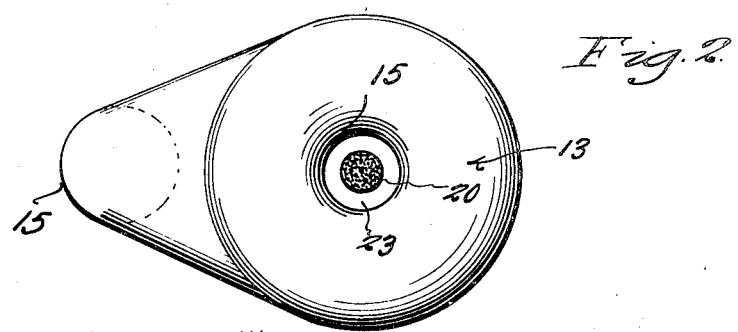
Figure 2 is a plan view of the improved swivel arch hook.

In carrying out the invention, and for purposes of illustration, there is provided a tractor generally designated by the reference numeral 1 and formed with a hoist drum 2, and a clevis connection 3 for securing the tongue 4 of a logging truck 5 thereto by means of the pin 6.

The logging truck will be supported upon wheels 7 and will be provided with a guide pulley 8 and cooperating, vertically mounted guide pulleys 9 between which the cable 10 passing about the power hoist 2 will extend, said cable terminating in a loop 11 which will be placed about one end of a log 12 for raising said end from the ground while dragging the same to the desired destination.

The subject matter of the instant invention comprises an improved form of swivel arch hook generally denoted by the reference numeral 13, and comprising an enlarged, substantially round body portion 14 and an integrally formed, depending hook portion 15.

The outer end of the body 14 of said hook will be rounded and formed with a frusto-conical entrance 15 for the centrally disposed aperture extending through the complete length of said body portion 14.

An annular bearing seat 16 will be formed about the centrally disposed aperture through said body 14, and will removably support the radial ball-bearing 17 thereon, while a second annular bearing seat 18 slightly larger than said annular seat 16 will be formed in the body 14 adjacent thereto, and will support the removable tapered roller bearing 19 in position thereon to contact a portion of the adjacent side edges of said radial ball-bearing 17.

Figure 3:
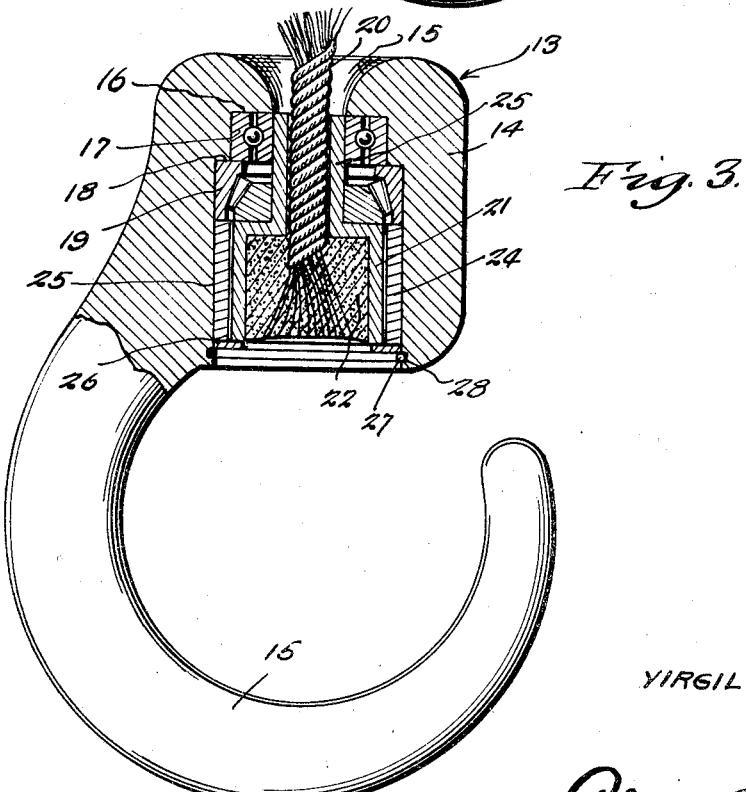
Figure 3 is a side elevation of the improved swivel arch hook showing a portion thereof in section to disclose the inner body construction thereof.

The steel wire cable 20 will be secured in a ferrule 21 and held secured therein by means of the solder 22 placed about the opened end of said cable to fill the said ferrule completely full. The ferrule 21 is provided with a reduced bearing collar 23 formed integrally thereon and adapted to be positioned in engagement with the inner portions of said radial ball-bearing 16 and the tapered roller bearing 19, providing for the swivelling of the ferrule secured to the end of said steel wire cable 20, as clearly illustrated in Figure 3 of the drawings.

The annularly disposed bearing ring 24 will be positioned about the ferrule 21 in contact with the side or edge of said roller bearing 19, and will having bearing engagement with the annular inside wall 25 formed in the said body 14 of the hook 13. After the radial ball-bearing 17 and the tapered roller bearing 19 have been positioned within the body of the hook 13 and the ferrule 21 with surrounding bearings 24 have been placed in their respective positions, a disk plate or washer 26 will be positioned over the adjacent ends of the said ferrule 21 and bearing ring 24, and will be held therein by means of the snap-in round spring 27 which will be received within the annular groove 28 formed about the wall 25 in the body 13 of the hook, thereby locking all cooperating parts in their respective positions.

From the foregoing description, it will be apparent that there has been provided an improved form of swivel arch hook which will be positively supported upon the end of a steel wire cable for swivel motion about said cable, and the swivel motion will be rendered free and unrestricted due to the use of the cooperating ball-bearing and roller bearing races mounted within the body of the said hook. Inasmuch as the lower end of the hook has been rounded off and is formed to provide a frusto-conical entrance for the steel wire cable 20, there will be no chance of the cable becoming entangled or chafing upon any adjacent portion of said hook, thereby weakening the cable.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention, what I claim as new and desire to secure by Letters Patent of the United States is:

1. A swivel arch hook including a body having a depending hook integrally formed thereon, and also having axially disposed concentric stepped bores in said body, a radial ball-bearing disposed in the smaller of said bores, a tapered roller bearing disposed in said larger bore, an annular bearing sleeve disposed in said larger bore abutting said tapered roller bearing, a stepped ferrule disposed with one portion extending through said radial ball-bearing and said tapered roller bearing, and with the enlarged portion of said ferrule being swivelly mounted within said annular bearing sleeve, a cable having one of its ends extending through said ferrule and anchored in the enlarged portion of said ferrule, a thrust washer overlying the ends of said annular bearing sleeve and said ferrule, and a split locking washer seated in the end of said larger bore for holding the various parts in assembled relation, and said body having a frusto-conical entrance for the reception of said cable.

2. A swivel arch hook including a body having an extending hook integrally formed thereon and also having axially disposed stepped bores therein, a radial ball bearing disposed in the smaller of said bores, an annular bearing sleeve disposed in the larger of said bores, a tapered roller bearing disposed between said annular bearing sleeve and the radial ball-bearing and positioned in the larger of said bores, a stepped ferrule adapted for disposition within the bores and having an enlarged portion swivelly mounted within the bearing sleeve and a smaller portion extending through the radial ball-bearing and tapered roller bearing, a cable held at one end within the ferrule, and means for securing and retaining said various parts in assembled relation within the body.

VIRGIL WRIDGE.

REFERENCES CITED

The following references are of record in the file of this patent:

UNITED STATES PATENTS

| Number | Name | Date |
| --- | --- | --- |
| 734,664 | Brittan | July 28, 1903 |
| 802,537 | Uren | Oct. 24, 1905 |
| 1,559,713 | Lester | Nov. 3, 1925 |
| 1,747,385 | Olson et al. | Feb. 18, 1930 |
| 1,773,045 | Koons | Aug. 12, 1930 |
| 2,077,293 | Weaver | Apr. 13, 1937 |